(12) United States Patent
Seo et al.

(10) Patent No.: US 11,217,246 B2
(45) Date of Patent: Jan. 4, 2022

(54) COMMUNICATION ROBOT AND METHOD FOR OPERATING THE SAME

(71) Applicant: LG ELECTRONICS INC., Seoul (KR)

(72) Inventors: Jae Pil Seo, Seoul (KR); Hyeon Sik Choi, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 16/584,748

(22) Filed: Sep. 26, 2019

(65) Prior Publication Data

US 2020/0027460 A1    Jan. 23, 2020

(30) Foreign Application Priority Data

Aug. 30, 2019    (KR) .......................... 10-2019-0107564

(51) Int. Cl.
*G10L 15/22*    (2006.01)
*G06F 3/01*    (2006.01)
(Continued)

(52) U.S. Cl.
CPC .............. *G10L 15/22* (2013.01); *G06F 3/013* (2013.01); *G06F 40/211* (2020.01); *G06F 40/30* (2020.01); *G10L 13/00* (2013.01); *G10L 15/1815* (2013.01); *G10L 15/25* (2013.01); *G10L 2015/088* (2013.01); *G10L 2015/223* (2013.01); *H04L 67/12* (2013.01); *H04W 84/042* (2013.01)

(58) Field of Classification Search
CPC ........ G06F 40/30; G06F 40/211; G06F 3/013; G10L 15/22; G10L 13/00; G10L 15/1815; G10L 15/25; G10L 2015/088; G10L 2015/223; H04L 67/12; H04W 84/042
See application file for complete search history.

(56) References Cited

U.S. PATENT DOCUMENTS

2019/0297415 A1\*    9/2019    Huang .................... H04R 1/083
2019/0311715 A1\*    10/2019    Pfeffinger ............... G06F 3/167
(Continued)

FOREIGN PATENT DOCUMENTS

KR    10-0847152 B1    7/2008
KR    10-0904191 B1    6/2009

*Primary Examiner* — Michael Colucci
(74) *Attorney, Agent, or Firm* — Birch, Stewart, Kolasch & Birch, LLP

(57) ABSTRACT

Disclosed are a communication robot and a method for operating the same capable of smoothly processing speech recognition by executing an artificial intelligence (AI) algorithm and/or a machine learning algorithm in 5G environment connected for Internet of things. A method for operating a communication robot according to an embodiment of the present disclosure may include collecting speech uttered by two or more utterers approaching within a predetermined distance from the communication robot, collecting photographed images of the two or more utterers, determining whether a case where utterers of a wake-up word and a continuous word included in the uttered speech are the same is a first case, or whether a case where the utterers of the wake-up and the continuous word included in the uttered speech are different is a second case, and determining a voice reception enhancement direction according to the first case or the second case.

18 Claims, 7 Drawing Sheets

(51) Int. Cl.
*G10L 15/25* (2013.01)
*G10L 15/18* (2013.01)
*G06F 40/30* (2020.01)
*G06F 40/211* (2020.01)
*G10L 13/00* (2006.01)
*H04W 84/04* (2009.01)
*H04L 29/08* (2006.01)
*G10L 15/08* (2006.01)

(56) References Cited

U.S. PATENT DOCUMENTS

2020/0104094 A1* 4/2020 White .................... G10L 17/00
2020/0167597 A1* 5/2020 Nguyen ................. G06F 3/011

* cited by examiner

COMMUNICATION ROBOT AND METHOD FOR OPERATING THE SAME

CROSS-REFERENCE TO RELATED APPLICATION

This present application claims benefit of priority to Korean Patent Application No. 10-2019-0107564, entitled "COMMUNICATION ROBOT AND METHOD FOR OPERATING THE SAME", filed on Aug. 30, 2019, in the Korean Intellectual Property Office, the entire disclosure of which is incorporated herein by reference.

BACKGROUND

1. Technical Field

The present disclosure relates to a communication robot and a method for operating the same, and more particularly, to a communication robot and a method for operating the same capable of smoothly processing speech recognition even when a wake-up word utterer and a continuous word utterer are different by analyzing uttered speech and photographed images of two or more utterers approaching a communication robot.

2. Description of Related Art

Robots have been developed for industrial use and have been a part of factory automation. Recently, application fields of robots are rapidly increasing. For example, various types of robots, such as medical robots and spacecraft robots, are being used. In addition, household robots for use in ordinary households are also being developed.

Related Art 1 discloses a guidance robot which can search for a destination that a user inputs in a public facility, and guide the user to a destination to conveniently move from a large public facility to a destination desired by the user.

Related Art 2 discloses a robot guide system in which a user can utilize a touch of a touch sensor attached to the robot, to acquire information about functions of the robot and services provided by the robot.

Meanwhile, as a technology is developed, various services employing a speech recognition technology are introduced in many fields. The speech recognition technology is a technology that enables a mechanical device to understand speech uttered by a human being in order to provide human desired services, and more smooth interaction between a user and the mechanical device A speech recognition device using such a speech recognition technology described above initiates speech recognition only when a designated command is inputted. This is to prevent power and processing resources from being excessively consumed when a function for speech command recognition is constantly activated, and to prevent speech recognition that a user does not intend from occurring.

Such a command initiating the speech recognition may be referred to as a wake-up word, and features relevant to wake-up word recognition, since they typically pose a relatively low computational load, may be always running in the background in a speech recognition device. That is, the wake-up word is a word registered in advance in the speech recognition device, and when the uttered speech information of the user includes a wake-up word, the speech recognition device may recognize the wake-up word and transmit a voice signal to a linked server or perform a specified operation.

However, in case of the Related Art 1 and the Related Art 2, when there are two utterers around a robot, and one utterer utters a wake-up word and then the other utterer utters a continuous word, the robot with a speech recognition function receives a voice signal enhanced in a direction of the utterer who utters the wake-up word, and as a result, the probability of failure of speech recognition of the continuous word uttered by the other utterer increases.

The above information disclosed in this Background section is provided only for enhancement of understanding of the background of the present disclosure and therefore it may contain information that does not form the prior art that is already known in this country to a person of ordinary skill in the art.

RELATED ART DOCUMENT

Patent Document

Related Art 1: Korean Patent No. 10-0904191 (Registered on Jun. 16, 2009)
Related Art 2: Korean Patent No. 10-0847152 (Registered on Jul. 11, 2008)

SUMMARY OF THE INVENTION

An aspect of the present disclosure is to perform speech recognition processing by determining a voice reception enhancement direction as a direction in which an utterer utters, in a case where a wake-up word utterer and a continuous word utterer are the same by analyzing uttered speech and a photographed image of two or more utterers approaching a communication robot.

An aspect of the present disclosure is to perform speech recognition processing by determining a voice reception enhancement direction as a direction in which an utterer utters, in a case where a wake-up word utterer and a continuous word utterer are different by analyzing uttered speech and a photographed image of two or more utterers approaching a communication robot.

An aspect of the present disclosure is to perform speech recognition processing by determining a voice reception enhancement direction as a direction in which an utterer utters a continuous word, in a case where the wake-up word utterer and the continuous word utterer are the same and different by analyzing uttered speech and a photographed image of two or more utterers approaching a communication robot.

An aspect of the present disclosure is to determine a continuous word utterer through gaze tracking and lipreading recognition of a photographed image of an utterer to check whether the same utterer utters the continuous word after recognizing a wake-up word.

According to an exemplary embodiment of the present disclosure, a method for operating a communication robot may include processing speech recognition even when a wake-up word utterer and a continuous word utterer are different by analyzing uttered speech and photographed images of two or more utterers approaching the communication robot.

Specifically, according to an exemplary embodiment of the present disclosure, a method for operating a communication robot may include: collecting speech uttered by two or more utterers approaching within a predetermined distance from the communication robot; collecting photographed images of the two or more utterers approaching within the predetermined distance from the communication robot; determining whether a case where utterers of a wake-up word and a continuous word included in the uttered speech are the same is a first case, or whether a case where the utterers of the wake-up and the continuous word included in the uttered speech is a second case by analyzing the uttered speech and the photographed image; and determining a voice reception enhancement direction for speech recognition according to the first case or the second case determined in the determining.

According to an exemplary embodiment of the present disclosure, a method for operating a communication robot may smoothly perform speech recognition when a wake-up word utterer and a continuous word utterer are the same and different by analyzing uttered speech and photographed images of two or more utterers approaching the communication robot.

The determining may include: estimating a first utterance direction according to a detection of a position of the utterer that utters the wake-up word among the two or more utterers; estimating a second utterance direction according to the detection of the position of the utterer that utters the continuous word among the two or more utterers by analyzing the photographed images of each of the two or more utterers; determining, as the first case, a case where a difference between the first utterance direction and the second utterance direction is within a reference value; and determining, as the second case, a case where a difference between the first utterance direction and the second utterance direction exceeds the reference value.

The estimating of the first utterance direction may include estimating the first utterance direction according to the detection of the position of the utterer uttering the wake-up word using a time delay of arrival (TDOA) algorithm which detects directions of sound sources based on a correlation of time differences in sound sources collected by a plurality of microphones in a time domain.

The estimating of the second utterance direction may include estimating, as the second utterance direction, a difference value between a reference coordinate set in a camera generating the photographed images of the two or more utterers and a position coordinate of the utterer uttering the continuous word included in the photographed image generated by the camera.

The method for operating a communication robot according to an exemplary embodiment of the present disclosure may further include: tracking gazes of each of the two or more utterers from the photographed images of each of the two or more utterers prior to the estimating of the second utterance direction; performing lipreading recognition of each of the two or more utterers from the photographed images of each of the two or more utterers; and determining an utterer that is uttering as a result of performing the lipreading recognition as the utterer uttering the continuous word while staring at the communication robot as a result of tracking the gaze.

The determining of the voice reception enhancement direction may include further increasing sensitivity of speech uttered from the first utterance direction than before, if it is determined in the determining that the case where the difference between the first utterance direction and the second utterance direction is within the reference value is the first case.

The determining of the voice reception enhancement direction may include further increasing sensitivity of speech uttered from the second utterance direction than before, if it is determined in the determining that the case where the difference between the first utterance direction and the second utterance direction exceeds the reference value is the second case.

The method for operating a communication robot according to an exemplary embodiment of the present disclosure may further include performing speech recognition on the continuous word after the determining of the voice reception enhancement direction.

The performing of the speech recognition on the continuous word may include activating the speech recognition in response to the reception of the wake-up word uttered by any one of the two or more utterers.

The performing of the speech recognition on the continuous word may include: generating continuous word text obtained by converting the continuous word into text; understanding an utterance intention of the continuous word by performing syntactic analysis and semantic analysis on the continuous word text; generating response text using a knowledge base corresponding to the utterance intention; and converting the response text into response uttered speech in a natural language utterance form.

According to an exemplary embodiment of the present disclosure, a communication robot may include: a first collector configured to collect speech uttered by two or more utterers approaching within a predetermined distance from the communication robot; a second collector configured to collect photographed images of the two or more utterers approaching within the predetermined distance from the communication robot; a determiner configured to determine whether a case where utterers of a wake-up word and a continuous word included in the uttered speech are the same is a first case, or whether a case where the utterers of the wake-up and the continuous word included in the uttered speech are different is a second case by analyzing the uttered speech and the photographed image; and a signal processor configured to determine a voice reception enhancement direction for speech recognition according to the first case or the second case determined in the determining.

According to an exemplary embodiment of the present disclosure, the communication robot may smoothly perform speech recognition when a wake-up word utterer and a continuous word utterer are the same and different by analyzing uttered speech and photographed images of two or more utterers approaching the communication robot.

The determiner may include: a first estimator configured to estimate a first utterance direction according to a detection of a position of the utterer that utters the wake-up word among the two or more utterers; a second estimator configured to estimate a second utterance direction according to the detection of the position of the utterer that utters the continuous word among the two or more utterers by analyzing the photographed images of each of the two or more utterers; and an utterer determiner configured to determine, as the first case, a case where a difference between the first utterance direction and the second utterance direction is within a reference value and determine, as the second case, a case where a difference between the first utterance direction and the second utterance direction exceeds the reference value.

The first estimator may be configured to estimate the first utterance direction according to the detection of the position of the utterer uttering the wake-up word using a time delay of arrival (TDOA) algorithm which detects directions of sound sources based on a correlation of time differences in sound sources collected by a plurality of microphones in a time domain.

The second estimator may be configured to estimate, as the second utterance direction, a difference value between a reference coordinate set in a camera generating the photographed images of the two or more utterers and a position coordinate of the utterer uttering the continuous word included in the photographed image generated by the camera.

The communication robot may further include: a continuous word utterer determiner configured to track gazes of each of the two or more utterers from the photographed images of each of the two or more utterers prior to the estimating of the second utterance direction, perform lip-reading recognition of each of the two or more utterers from the photographed images of each of the two or more utterers, and determine an utterer that is uttering as a result of performing the lipreading recognition as the utterer uttering the continuous word while staring at the communication robot as a result of tracking the gaze.

The signal processor may be configured to further increase sensitivity of speech uttered from the first utterance direction than before, if it is determined by the determiner that the case where the difference between the first utterance direction and the second utterance direction is within the reference value is the first case.

The signal processor may be configured to further increase sensitivity of speech uttered from the second utterance direction than before, if it is determined by the determiner that the case where the difference between the first utterance direction and the second utterance direction exceeds the reference value is the second case.

The communication robot according to an exemplary embodiment of the present disclosure may further include a speech recognizer configured to perform speech recognition on the continuous word after the determining of the voice reception enhancement direction.

The speech recognizer may be configured to be activated in response to the reception of the wake-up word uttered by any one of the two or more utterers.

The speech recognizer may be configured to generate continuous word text obtained by converting the continuous word into text, understand an utterance intention of the continuous word by performing syntactic analysis and semantic analysis on the continuous word text, generate response text using a knowledge base corresponding to the utterance intention, and convert the response text into response uttered speech in a natural language utterance form.

In addition, other methods and other systems for implementing the present disclosure, and a computer-readable medium for storing a computer program for executing the above method may be further provided.

Other aspects, features, and advantages other than those described above will become apparent from the following drawings, claims, and detailed description of the present disclosure.

According to the present disclosure, it is possible to smoothly perform the speech recognition processing by determining the voice reception enhancement direction as the direction in which the utterer utters and more increasing the sensitivity of the uttered speech collected from the determined direction, in a case where the wake-up word utterer and the continuous word utterer are the same by analyzing the uttered speech and the photographed image of two or more utterers approaching the communication robot.

In addition, according to the present disclosure, it is possible to smoothly perform the speech recognition processing by determining the voice reception enhancement direction as the direction in which the utterer utters and more increasing the sensitivity of the uttered speech collected from the detected direction, in a case where the wake-up word utterer and the continuous word utterer are different by analyzing the uttered speech and the photographed image of two or more utterers approaching the communication robot.

In addition, according to the present disclosure, it is possible to smoothly perform the speech recognition processing by determining the voice reception enhancement direction as the direction in which the utterer utters the continuous word and more increasing the sensitivity of the uttered speech collected from the determined direction, in a case where the wake-up word utterer and the continuous word utterer are the same and are different by analyzing the uttered speech and the photographed image of two or more utterers approaching the communication robot.

In addition, it is possible to increase the speech recognition processing speed by determining the continuous word utterer through the gaze tracking and the lipreading recognition of the photographed image of the utterer to check whether the same utterer utters the continuous word after the wake-up word is recognized.

In addition, although the communication robot is a mass-produced and standardized product, since the user may perceive the communication robot as a personalized device, the effects associated with user-customized products may be provided to the user.

The effects of the present disclosure are not limited to the effects mentioned above, and other effects not mentioned may be clearly understood by those skilled in the art from the following description.

DETAILED DESCRIPTION

Figure 1:
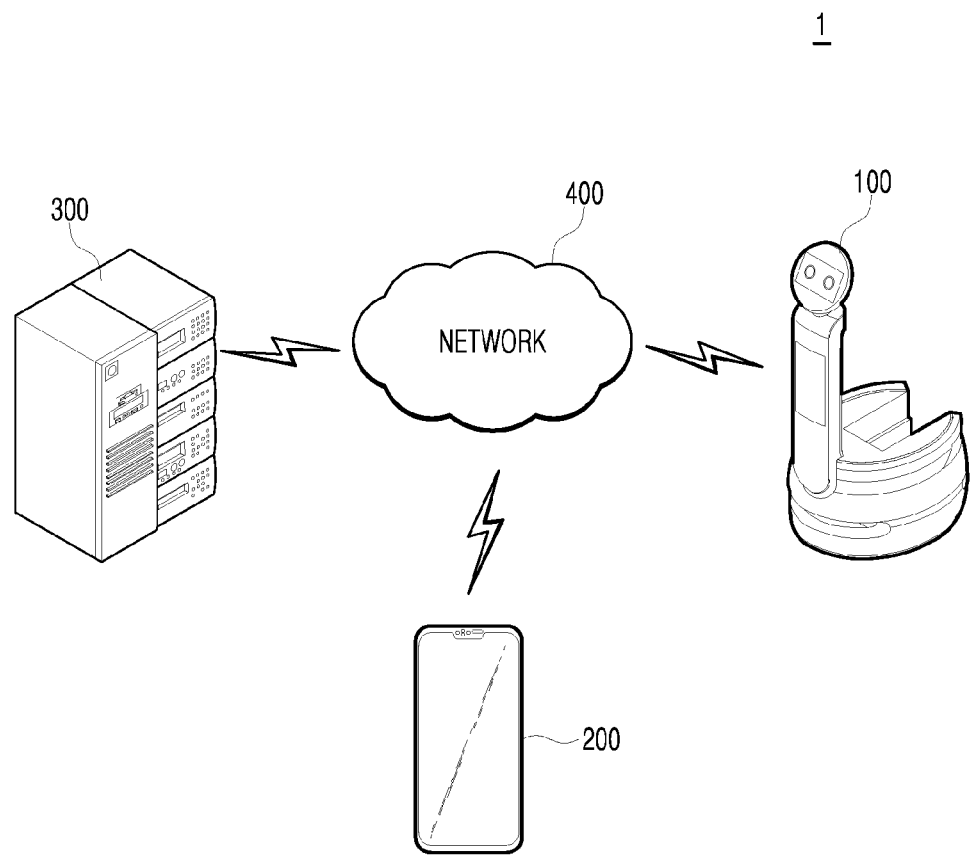
FIG. 1 is a conceptual diagram illustrating a communication robot driving environment including a communication robot, a user terminal, a server, and a network for connecting the above elements, according to an exemplary embodiment of the present disclosure.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

FIG. 1 is a conceptual diagram illustrating a communication robot driving environment including a communication robot, a user terminal, a server, and a network for connecting the above elements, according to an exemplary embodiment of the present disclosure. Referring to FIG. 1, a communication robot driving environment 1 may include a communication robot 100, a user terminal 200, a server 300, and a network 400.

The communication robot 100 can perform roles such as patrol, guidance, cleaning, disinfection and transportation in a public place (e.g., an airport, a hospital, a company, etc.). For example, when the communication robot 100 is disposed at an airport, the communication robot 100 can provide an airport route guidance service, a boarding information guidance service, other multimedia contents service, a luggage transportation service, etc. In addition, when the communication robot 100 is disposed in a hospital, the communication robot 100 can provide an intra-hospital route guidance service, a medical office and a hospital room guidance service, and the like.

The communication robot 100 may receive service request information from an utterer to provide the services described above. A method for receiving, by a communication robot 100, service request information from an utterer may include at least one of a case of receiving an uttered speech including a wake-up word and a continuous word corresponding to a service request from an utterer in a case where a touch signal for a display (141 in FIG. 3) is received from an utterer and/or a case of generating a photographed image of an operation (for example, gesture guiding an approach to the communication robot 100, and the like) corresponding to a service request of an utterer. Here, the conditions under which the communication robot 100 can receive service request information from the utterer may include a case where the utterer approaches within a predetermined distance (e.g., adjacent area 101—1 m in FIG. 2) from the communication robot 100. The communication robot 100 that has received service request information from the utterer can generate service response information corresponding thereto, and output service response information through a display 141 and/or an audio output interface (142 in FIG. 4). Furthermore, the communication robot 100 can transmit service response information to a user terminal 200.

The communication robot 100 may collect speech uttered by two or more utterers approaching within a predetermined distance from the communication robot 100, and collect photographed images of the two or more utterers approaching within the predetermined distance from the communication robot 100. The communication robot 100 may determine a first case where the utterers of the wake-up word and the continuous word included in the uttered speech are the same or a second case where the utters of the wake-up word and the continuous word included in the uttered speech are different by analyzing the uttered speech and photographed images, and determine a voice reception enhancement direction for speech recognition according to the case determined in the determining.

When determining the first case or the second case, the communication robot 100 may estimate a first utterance direction according to a detection of a position of an utterer that utters the wake-up word among two or more utterers, and estimate a second utterance direction according to a detection of a position of an utterer that utters a continuous word among the two or more utterers by analyzing the photographed images of each of the two or more utterers. If any one of the two or more utterers approaching within a predetermined distance utters the wake-up word, the communication robot 100 receiving the wake-up word may activate a speech recognition function. The communication robot 100 may determine, as the first case, the case where a difference between the first and second utterance directions is within a reference value, and determine, as the second case, the case where the difference between the first and second utterance directions exceeds the reference value.

The communication robot 100 may perform a process of enhancing the uttered speech in the first direction after determining the first case by analyzing the uttered speech and the photographed images of the two or more utterers approaching within a predetermined distance, and a process of enhancing the uttered speech in the second direction after determining the second case by analyzing the uttered speech and the photographed images of the two or more utterers approaching within the predetermined distance.

In the related art, when the number of utterers approaching the predetermined distance from the communication robot 100 is one and the utterer utters the wake-up word, the communication robot 100 may recognize the wake-up word to activate the speech recognition function. Subsequently, the communication robot 100 finds the position of the utterer that utters the wake-up word, and performs the speech recognition on the continuous word by enhancing the voice signal (for example, continuous word) uttered at the position. Meanwhile, it is assumed that there is a case where the number of utterers approaching within the predetermined distance from the communication robot 100 is two, and a first utterer utters a wake-up word and a second utterer utters a continuous word. Since the communication robot 100 finds the position of the utterer based on the wake-up word, the communication robot 100 may enhance the voice signal by finding the position of the first utterer that utters only the wake-up word without uttering the continuous word. Therefore, the position of the second utterer that utters the continuous word is not found, and thus the speech recognition performance of the continuous word is drastically degraded.

However, in the present embodiment, even in the case where the wake-up word utterer and the continuous word utterer are different after the speech recognition is activated by the recognition of the wake-up word, the communication robot 100 may find the position of the continuous word utterer based on the photographed image, and enhance the voice signal at the position of the utterer uttering the continuous word to perform the speech recognition, thereby smoothly performing the speech recognition process.

The user terminal 200 may receive a service for driving or controlling the communication robot 100 through an authentication process after accessing a communication robot driving application or communication robot driving site. In the present embodiment, the authenticated user terminal 200 may drive the communication robot 100, and may control operation of the communication robot 100.

The user terminal 200 may include a communication terminal capable of executing a function of a computing device (not shown). In the present embodiment, the user terminal 200 may include, but is not limited to, a desktop computer, smartphone, laptop computer, tablet PC, smart TV, cell phone, personal digital assistant (PDA), laptop, media player, micro server, global positioning system (GPS) device, electronic book terminal, digital broadcast terminal, navigation device, kiosk, MP3 player, digital camera, home appliance, and other mobile or immobile computing devices operated by the user, that is the utterer. Furthermore, the user terminal 200 may be a wearable terminal having a communication function and a data processing function, such as a watch, glasses, a hair band, or a ring. The user terminal 200 is not limited to the above-mentioned devices, and thus any terminal that supports web browsing may be adopted.

The server 300 may be a database server that provides big data required for applying various artificial intelligence algorithms and data for operating the communication robot 100. In addition, the server 300 may include a web server or an application server that enables remote control of the operation of the communication robot 100 using a communication robot driving application or a communication robot driving web browser installed in the user terminal 200.

Artificial intelligence (AI) is an area of computer engineering science and information technology that studies methods to make computers mimic intelligent human behaviors such as reasoning, learning, self-improving, and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. Specifically, the Machine Learning can be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

The server 300 can receive and analyze service request information from the communication robot 100, and generate communication information corresponding to service request information, that is, service response information, to transmit the generated communication information to the communication robot 100. In particular, the server 300 can receive an uttered speech corresponding to the utterer's service request from the communication robot 100, generate the processing result of the uttered speech as service response information, through speech recognition processing, and provide it to the communication robot 100. Here, according to the processing capability of the communication robot 100, it may recognize and process the uttered speech corresponding to the utterer's service request described above, and generate the processing result as service response information.

The network 400 may perform a role in connecting the communication robot 100, the user terminal 200, and the server 300. The network 400 may include a wired network, such as a local area network (LAN), a wide area network (WAN), a metropolitan area network (MAN), or an integrated service digital network (ISDN), or a wireless network, such as a wireless LAN, CDMA, Bluetooth, or satellite communication; however, the present disclosure is not limited thereto. In addition, the network 400 may transmit and receive information using short distance communication and/or long distance communication. Here, the short distance communication may include Bluetooth, radio frequency identification (RFID), infrared data association (IrDA), ultra-wideband (UWB), ZigBee, or wireless fidelity (Wi-Fi) technology, and the long distance communication may include code division multiple access (CDMA), frequency division multiple access (FDMA), time division multiple access (TDMA), orthogonal frequency division multiple access (OFDMA), or single carrier frequency division multiple access (SC-FDMA) technology.

The network 400 may include a connection of network elements such as a hub, a bridge, a router, a switch, and a gateway. The network 400 can include one or more connected networks, for example, a multi-network environment, including a public network such as an internet and a private network such as a safe corporate private network. The access to the network 400 can be provided via one or more wired or wireless access networks. Further, the network 400 may support 5G communication and/or an Internet of things (IoT) network for exchanging and processing information between distributed components such as objects.

Figure 2:
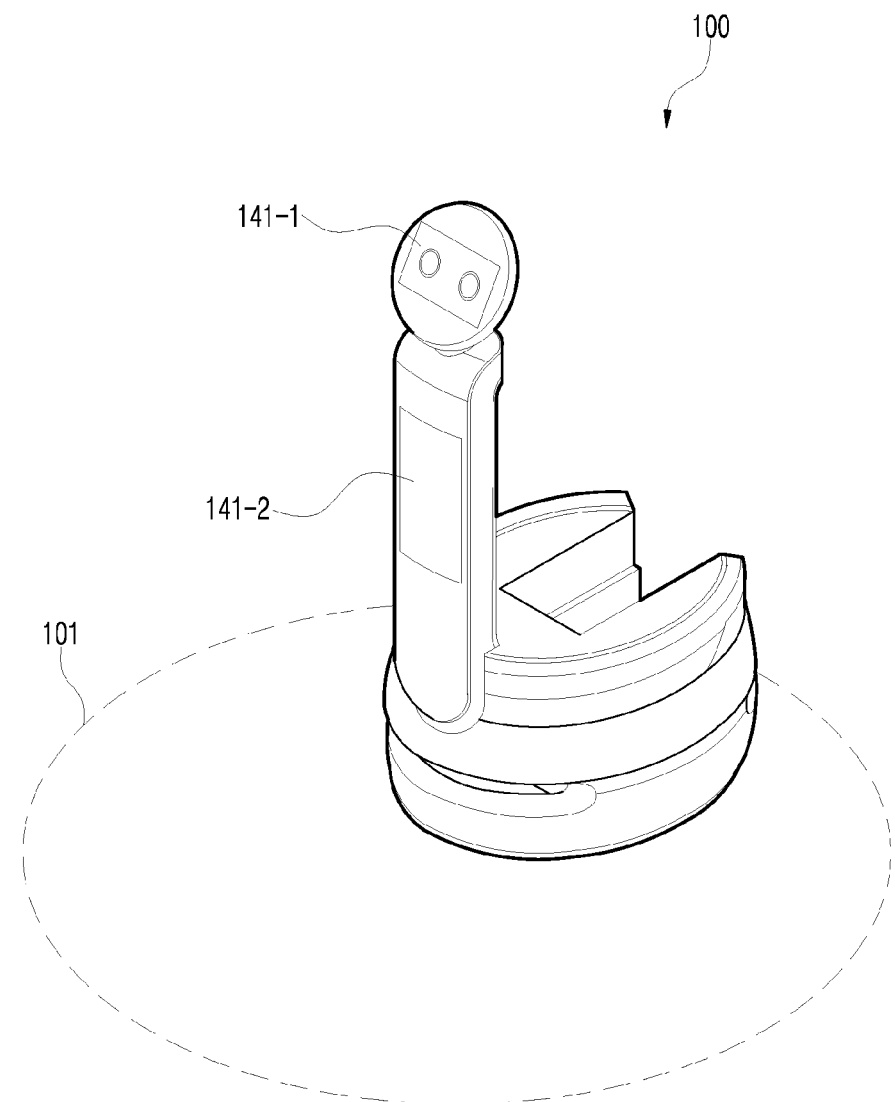
FIG. 2 is a diagram for schematically describing an exterior of a communication robot according to an exemplary embodiment of the present disclosure.

FIG. 2 is a view for schematically explaining the exterior of a communication robot according to an exemplary embodiment of the present disclosure. Hereinafter, a description of components that are identical to the components shown in FIG. 1 will be omitted.

The communication robot 100 may communicate with a user through emotional interactions such as eye contact, emotional expression, and touch. When the utterer strokes the communication robot 100 or the communication robot 100 receives a speech of an utterer, the communication robot 100 may display various facial expressions such as joy, sadness, anger, and calmness through eyes of a first display 141-1, and reproduce various contents and provide various information (for example, route guidance etc.) through a second display 141-2.

In addition, although not shown in FIG. 2, the first display 141-1 and the second display 141-2 are each provided with a camera 121, and so it is possible to photograph peripheral videos of the communication robot 100. Further, the back of the body of the communication robot 100 may further include a space (not shown) in which a luggage can be loaded and a space (not shown) in which an utterer can sit.

Further, as shown in FIG. 2, the communication robot 100 may initiate a specific function when the utterer approaches within an adjacent area 101. The adjacent area 101 can include, for example, an area 1 m away from the robot. Here, the specific function may include a function for the communication robot 100 to utter a set speech to the utterer (for example, customer, what can it do for you) or to display a happy face through the eyes of the first display 141-1, or a function of reproducing a set content via a second display 141-2. Further, the judgment of access to the adjacent area 101 for the utterer may use distance information calculated using information (for example, an infrared sensor, an ultrasonic sensor) detected by a sensor (130 in FIG. 3) described later.

Figure 3:
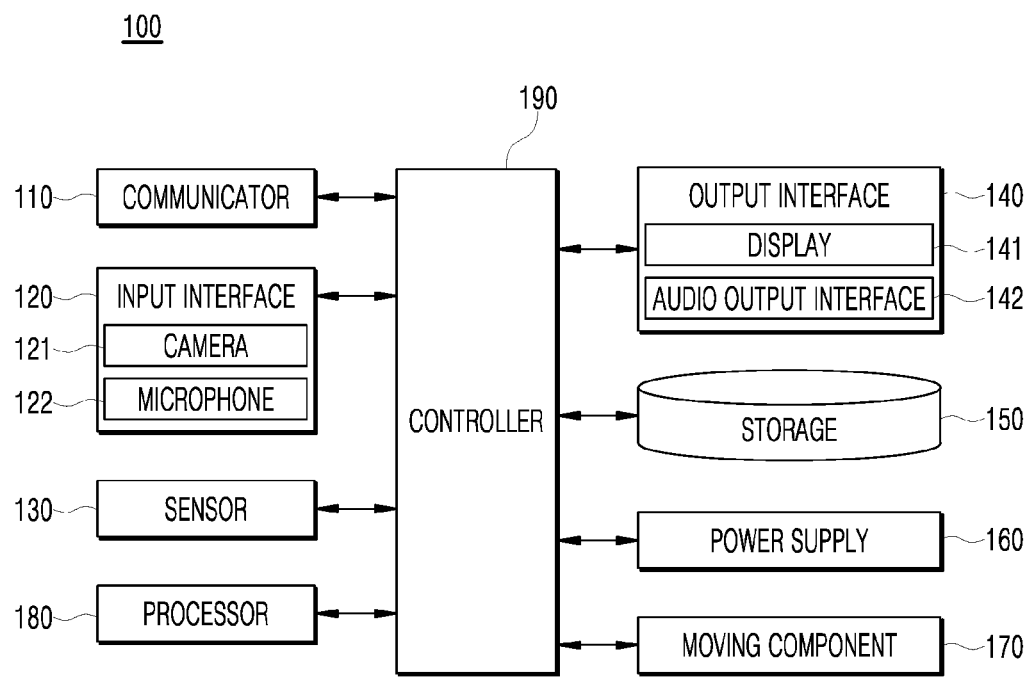
FIG. 3 is a schematic block diagram of a communication robot according to an exemplary embodiment of the present disclosure.

FIG. 3 is a schematic block diagram of a communication robot according to an exemplary embodiment of the present disclosure. In the following description, description of parts that are the same as those in FIG. 1 and FIG. 2 will be omitted. Referring to FIG. 3, the communication robot 100 may include a communicator 110, an input interface 120, a sensor 130, an output interface 140, a storage 150, a power supply 160, a moving component 170, a processor 180, and a controller 190.

The communicator 110 may provide a communication interface required to provide signals transmitted/received between the user terminal 200, and/or the server 300 in the form of packet data in cooperation with the network 400.

The communicator 110 may provide a communication interface required to provide signals transmitted/received between the communication robot 100, the user terminal 200, and/or the server 300 in the form of packet data in cooperation with the network 400. Furthermore, the communicator 110 may serve to receive a predetermined information request signal from the user terminal 200, and transmit information processed by the communication robot 100 to the user terminal 200. Furthermore, the communicator 110 may transmit the predetermined information request signal from the user terminal 200 to the server 300, may receive a response signal processed by the server 300, and may transmit the response signal to the user terminal 200. Furthermore, the communicator 110 may be a device including hardware and software required for transmitting and receiving signals such as a control signal and data signals via a wired or wireless connection to another network device. Furthermore, the communicator 110 may support a variety of object-to-object intelligent communication, for example, Internet of things (IoT), Internet of everything (IoE), and Internet of small things (IoST), and may support, for example, machine to machine (M2M) communication, vehicle to everything (V2X) communication, and device to device (D2D) communication.

The input interface 120 may include a camera 121 for receiving input of image signals and a microphone 122 for receiving input of audio signals. Under control of the controller 190, the camera 121 may photograph an image of the surroundings of the communication robot 100 according to an operation mode and/or operation state of the communication robot 100. In order to increase efficiency of the photographing, a plurality of cameras 121 may also be provided. For example, the camera 121 may be installed on a first display 141-1 and a second display 141-2, and thus may not be visible in appearance. Such camera 121 may include an image sensor (e.g., a CMOS image sensor) configured to include at least one optical lens and multiple photodiodes (e.g., pixels) that are imaged by light passing through an optical lens), and a digital signal processor (DSP) (not shown) that forms a video based on signals output from photodiodes. The camera 121 can generate a still video and also a moving video including frames composed of the still video. Further, the image photographed and acquired by the camera 121 may be stored in the storage 150. In the present embodiment, the camera 121 may photograph images around the communication robot 100 and the image of the utterer.

In the present embodiment, the camera 121 may include a digital signal processor (not shown) to reduce noise for an image frame photographed by the camera 121, and perform image signal processing for improving image quality such as gamma correction, color filter array interpolation, color matrix, color correction, and color enhancement. Further, the digital image signal processor may perform functions such as a coloring process, a blurring process, an edge emphasizing process, an image analysis process, an image recognition, and an image effect process. Facial recognition, scene recognition, motion recognition, and the like may be performed for the image recognition. For example, brightness level adjustment, color correction, contrast adjustment, contour enhancement adjustment, screen division processing, character image generation, and image synthesis processing may be performed.

The microphone 122 may receive the uttered speech including the wake-up word and the continuous word uttered by the utterer toward the communication robot 100 under the control of the controller 190. In order to more accurately receive the uttered speech of the utterer, a plurality of the microphones 122 may also be used. Here, each of the plurality of microphones may be spaced apart from each other at different positions, and may process the received uttered speech of the utterer as an electrical signal. Here, the input interface 120 may use various noise removal algorithms to remove noise generated in the process of receiving the utterer voice signal. In an alternative example of the present disclosure, the input interface 120 may include various constituent elements for processing uttered speeches of the utterer, such as a noise removal filter (not shown) for removing noise from the received uttered speech and an amplifier (not shown) for amplifying an output signal of the noise removal filter and outputting the amplified signal.

In an alternative example of the present disclosure, the input interface 120 may include a user input interface (not shown) (for example a touch-type key or a push-type mechanical key) for receiving information from the utterer, used in relation to the setting of the driving mode.

For example, the input interface 120 may include first to fourth contact switches (not shown). A program pre-stored in the storage 150 may determine how output signals of the respective contact switches are to be processed. For example, menus displayed in the left or right direction on the second display 141-2 may be selected according to the operation signals of the first contact switch or the second contact switch, and menus displayed upward or downward on the second display 141-2 may be selected according to the operation signals of the third contact switch or the fourth contact switch. In addition, a speech recognition function may be activated by operating any one of the first to fourth contact switches.

The sensor 130 may include one or more sensors for sensing at least one among internal information of the communication robot 100, surrounding environment information of the communication robot 100, and utterer information. For example, the sensor 130 may include at least one among an obstacle detection sensor (for example, a proximity sensor or a Light Detection And Ranging (LiDAR) sensor), a weight detection sensor, an illumination sensor, a touch sensor, an acceleration sensor, a magnetic sensor, a gravity sensor (G-sensor), a gyroscope sensor, a motion sensor, an RGB sensor, an infrared (IR) sensor, a fingerprint recognition sensor, an ultrasonic sensor, an optical sensor (for example, the camera 121), a microphone (for example, the microphone 122), a battery gauge, an environmental sensor (for example, a barometer, a hygrometer, a thermometer, a radioactivity detection sensor, a heat detection sensor, or a gas detection sensor), and a chemical sensor (for example, an electronic nose, a healthcare sensor, or a biometric sensor). In addition, the communication robot 100 of the present disclosure may combine various kinds of information sensed by at least two of the above-mentioned sensors, and may use the combined information.

The output interface 140 may output information related to operations of the communication robot 100 as, for example, visual data, auditory data, and tactile sensation data. The output interface 140 may include a display 141, an audio output interface 142, and a haptic output interface (not shown). In the present embodiment, the display 141 may include a first display 141-1 and a second display 141-2 as shown in FIG. 2.

The display 141 may output information related to an operation of the communication robot 100 as visual data. The display 141 may form a mutual layer structure with a touch sensor, or may be formed integrally with the touch sensor, and may thereby be implemented as a touchscreen (not shown). The touchscreen may serve as a user input interface that provides an input interface between the communication robot 100 and the utterer, while at the same time providing an output interface between the communication robot 100 and the utterer.

The audio output interface 142 may output information related to the operation of the communication robot 100 as audio data, and may output notification messages such as a warning sound, an operation mode, an operation state, and an error state under the control of the controller 190 and output, as audio, information corresponding to the voice command included in the continuous word, processed results corresponding to the voice command of the utterer, and the like among the uttered speech of the utterer. The audio output interface 142 may convert an electrical signal received from the controller 190 into an audio signal. For this purpose, the audio output interface 142 may include, for example, a speaker (not shown).

The storage 150 may store data to support various functions of the communication robot 100. The storage 150 may store a plurality of application programs (or applications) to be driven by the communication robot 100, data for operating the communication robot 100, and commands for the communication robot 100. At least some of these application programs may be downloaded from an external server via wireless communication.

The storage 150 stores a wake-up word that can drive the communication robot 100. Thus, when the utterer utters a wake-up word, the processor 180 can recognize this and change the communication robot 100 which was in an inactive state into that in an activated state. Further, the storage 150 may store task information and the like to be performed by the communication robot 100 in response to an utterer's voice command (for example, an uttered speech for calling the communication robot 100).

In the present embodiment, the storage 150 may temporarily or permanently store data processed by the controller 190. Here, the storage 150 may include magnetic storage media or flash storage media, but the present disclosure is not limited thereto. The storage 150 may include an internal memory and/or an external memory. The storage 150 may include a volatile memory such as dynamic read-only memory (DRAM), static read-only memory (SRAM), or synchronous dynamic read-only memory (SDRAM), a non-volatile memory such as a one-time programmable ROM (OTPROM), a programmable read-only memory (PROM), an erasable programmable read only memory (EPROM), an electrically erasable and programmable read only memory (EEPROM), a mask ROM, a flash ROM, a NAND flash memory, or a NOR flash memory, a flash drive such as a solid state drive (SSD), a compact flash (CF) card, a secure digital (SD) card, a Micro-SD card, a Mini-SD card, an extreme digital (XD) card, or a memory stick, and/or a storage device such as a hard disk drive (HDD).

Here, simple speech recognition may be performed by the communication robot 100, and high-level speech recognition such as natural language processing may be performed by the server 300.

The power supply 160 may be applied with external power or internal power under the control of the controller 190 to supply power to each component of the communication robot 100. The power supply 160 may include a battery. The battery may be implemented as an embedded battery or a replaceable battery. The battery may be charged by a wired or wireless charging method and the wireless charging method may include a magnetic induction method or a self-resonance method. In the present embodiment, the battery may include a rechargeable secondary battery, for example, a nickel-cadmium battery, a lead battery, a nickel metal hydride (NiMH) battery, a lithium-ion battery, and a lithium polymer battery, but is not limited thereto.

In the present embodiment, the controller 190 may control charging or discharging of the battery, and may protect the battery by monitoring state information of the battery. For example, the controller 190 may perform various functions of the battery, for example, an overcharge protection function, an overdischarge protection function, an overcurrent protection function, an overvoltage protection function, an overheating protection function, and a cell balancing function of the battery. In addition, the controller 190 may acquire a current of the battery, a voltage of the battery, a temperature of the battery, a remaining power amount of the battery, a battery lifespan, and a state of charge (SOC) of the battery. For example, although not shown in the drawings, the controller 190 may measure a voltage and temperature of the battery using the sensor 130. If the sensor 130 detects the presence of an abnormal situation such as, for example, overcharging, overdischarging, overcurrent, or a high temperature in the battery, the controller 190 may protect the battery by controlling charging or discharging of the battery.

A moving component 170 includes a plurality of wheels (not shown), and may move and/or stop according to the operation mode and/or the operation state of the communication robot 100. The controller 190 may control the direction, movement and/or stop of the plurality of wheels. In an alternative embodiment, the controller 190 operates one or more of the plurality of wheels in response to the gesture of the utterer or the speech of the user, thereby allowing the communication robot 100 to move to an any place (for example, near the utterer).

The processor 180 may collect speech uttered by two or more utterers approaching within a predetermined distance from the communication robot 100, and collect photographed images of the two or more utterers approaching within the predetermined distance from the communication robot 100. The processor 180 may determine a first case where the utterers of the wake-up word and the continuous word included in the uttered speech are the same or a second case where the utters of the wake-up word and the continuous word included in the uttered speech are different by analyzing the collected uttered speech and photographed images, and determine the voice reception enhancement direction for the speech recognition according to the determined case.

In the present embodiment, the processor 180 may be provided outside the controller 190 as shown in FIG. 3, and provided inside the controller 190 and operate like the controller 190, or may be provided inside the server 300 of FIG. 1. Next, the processor 180 will be described in greater detail with reference to FIG. 4.

The controller 190, as a kind of central processing unit (CPU), may control overall operation of the communication robot 100 by driving control software embedded in the storage 150. Here, the controller 190 may include a device of any kind capable of processing data, such as a processor. Here, 'the processor' may, for example, refer to a data processing device embedded in hardware, which has physically structured circuitry to perform a function represented by codes or commands contained in a program. As one example of the data processing device embedded in the hardware, a microprocessor, a central processing unit (CPU), a processor core, a multiprocessor, an application-specific integrated circuit (ASIC), a field programmable gate array (FPGA), and the like may be included, but the scope of the present disclosure is not limited thereto.

In the present embodiment, the controller 190 may perform machine learning such as deep learning on the collected uttered speech and photographed image of the utterer so that the communication robot 100 can perform speech recognition smoothly, and the storage 150 may store data used for the machine learning, result data, and the like.

Deep learning technology, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Also, the artificial neural network can continuously update the weight values through learning. Furthermore, methods such as back propagation may be used in training the artificial neural network.

Meanwhile, the controller 190 may be equipped with an artificial neural network, and may perform machine learning based user (utterer) recognition and user's (utterer's) speech recognition using the received voice signal as input data.

The controller 190 may include an artificial neural network (ANN), for example, a deep neural network (DNN) such as a CNN, an RNN, or a DBN, and perform learning of the DNN. As a machine learning method for such an artificial neural network, both unsupervised learning and supervised learning may be used. In response to setting information, the controller 190 may update a speech recognition ANN structure after execution of learning.

Figure 4:
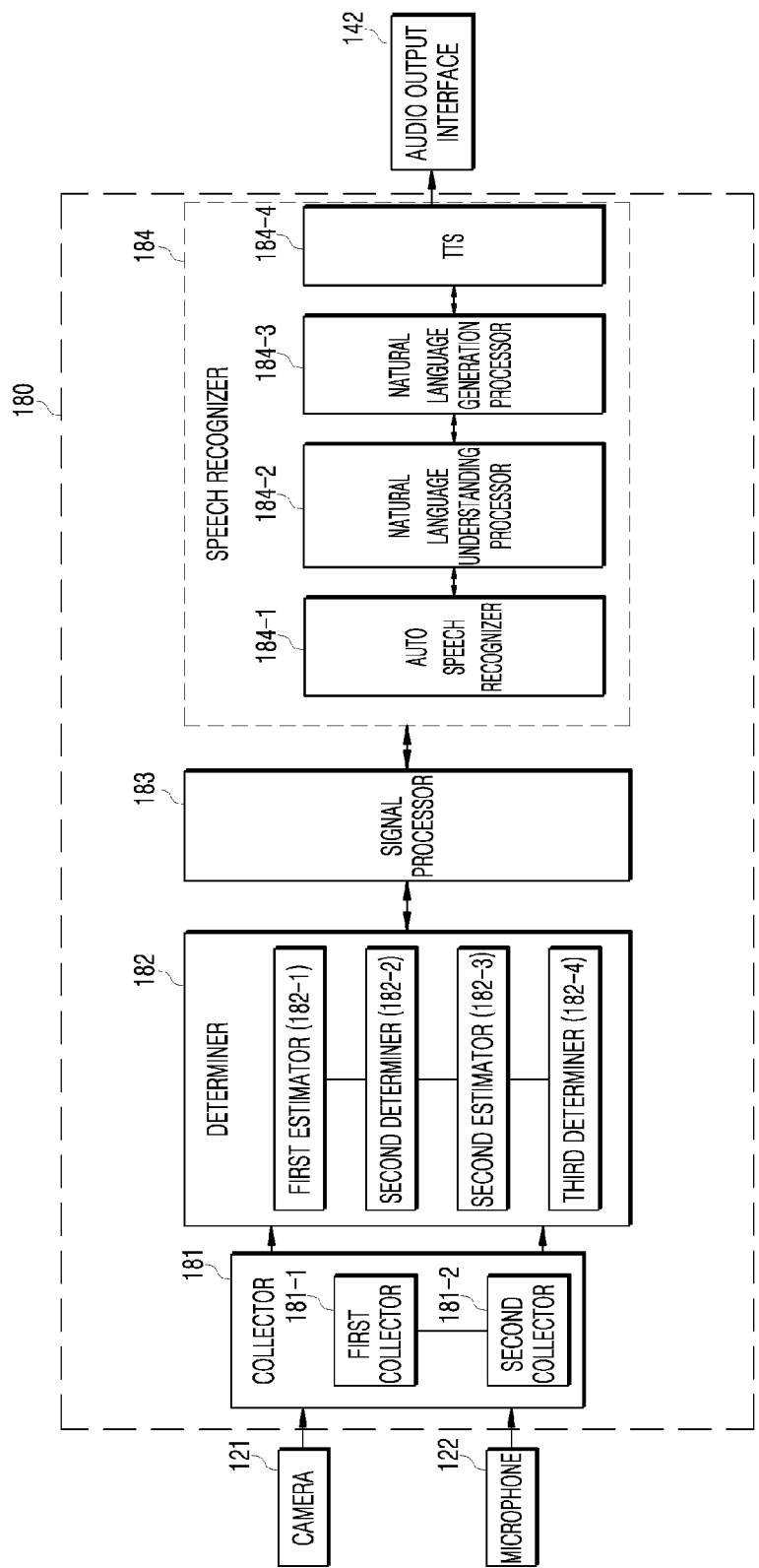
FIG. 4 is a schematic block diagram of the processor in FIG. 3.

FIG. 4 is a schematic block diagram of the processor in FIG. 3. Hereinafter, a description of components that are identical to the components described with reference to FIGS. 1 to 3 will be omitted. Referring to FIG. 4, the processor 180 may include a collector 181, a determiner 182, a signal processor 183, and a speech recognizer 184.

The collector 181 may collect information related to two or more titterers approaching within a predetermined distance (adjacent area 101) from the communication robot 100. In the present embodiment, the collector 181 may include a first collector 181-1 and a second collector 181-2.

The first collector 181-1 may collect speech uttered by two or more utterers approaching within a predetermined distance from the communication robot 100. The first collector 181-1 may collect the speech uttered by the two or more utterers which are input through the microphone 122. The uttered speech collected by the first collector 181-1 may be stored in the storage 150.

The second collector 181-2 may collect the photographed images of the two or more utterers approaching within the predetermined distance from the communication robot 100. The second collector 181-2 may collect the photographed images of the two or more utterers photographed by the camera 121. The photographed image of the utterer collected by the second collector 181-2 may be stored in the storage 150.

Figure 5:
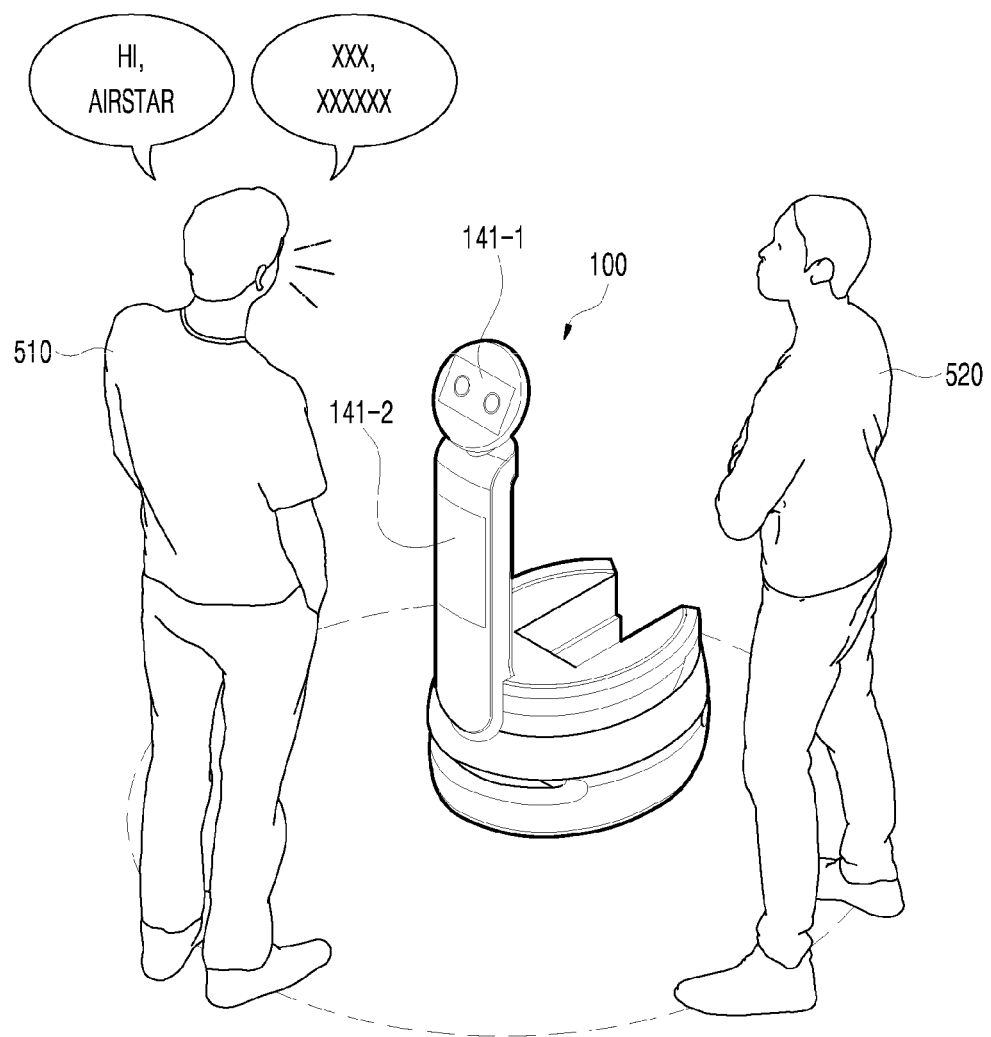
FIG. 5 is a conceptual diagram of determining a case where the communication robot according to an exemplary embodiment of the present disclosure determines that the wake-up word utterer and the continuous word utterer are the same.
Figure 6:
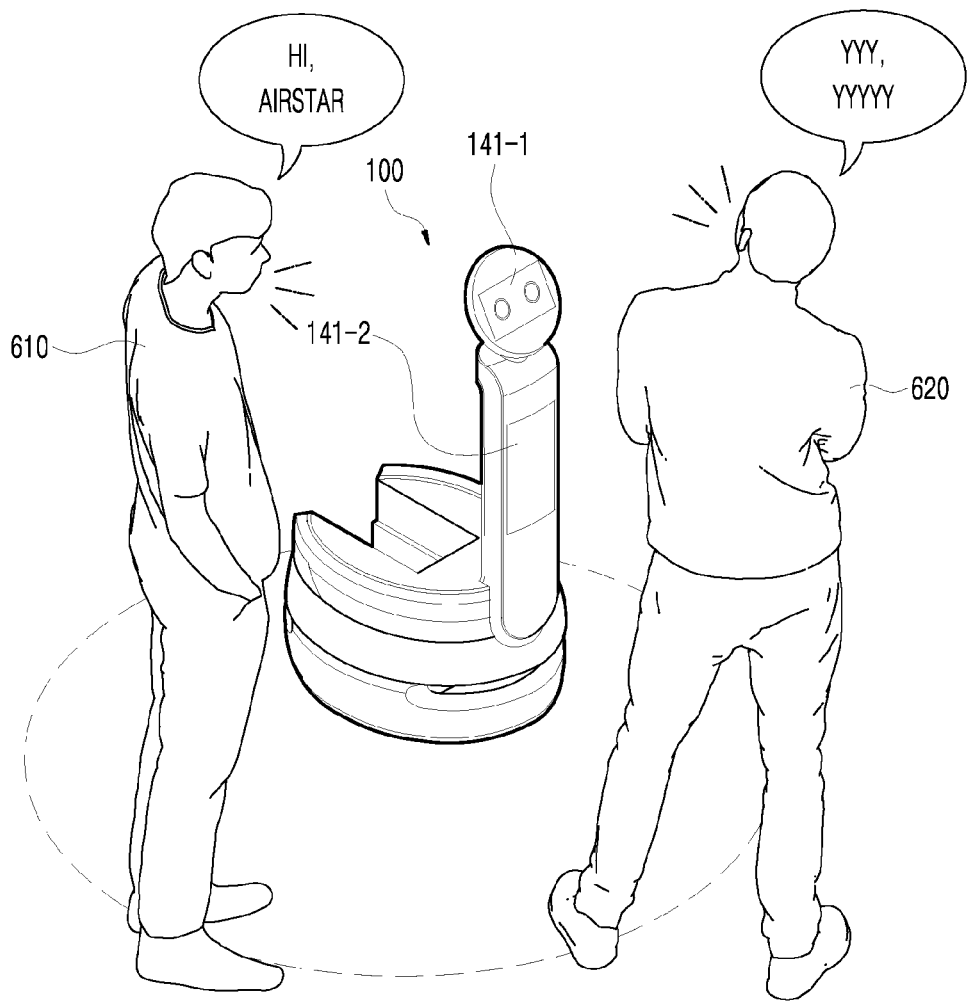
FIG. 6 is a conceptual diagram of determining a case where a communication robot according to another embodiment of the present disclosure determines that a wake-up word utterer and a continuous word utterer are different.

The determiner 182 may determine the first case or the second case by analyzing the speech uttered by the two or more utterers which is collected by the first collector 181-1 and the photographed images of the two or more utterers collected by the second collector 181-2. Here, the first case may include a case where the utterers of the wake-up word and the continuous word included in the uttered speech are the same, and the second case may include a case where the utterers of the wake-up word and the continuous word included in the uttered speech are different. For example, FIG. 5 illustrates the first case where among two or more utterers (utterer1 510 and utterer2 520) approaching within a predetermined distance from the communication robot 100, the utterer1 510 represents an utterer uttering the wake-up word and the continuous word and thus the wake-up word utterer and the continuous word utterer are the same. In addition, FIG. 6 illustrates the second case where among two or more utterers (utterer1 610 and utterer2 620) approaching within a predetermined distance from the communication robot 100, the utterer1 610 represents an utterer uttering the wake-up word and the utterer2 620 represents an utterer uttering the continuous word, and thus the wake-up word utterer and the continuous word utterer are different.

In the present embodiment, the determiner 182 may include a first estimator 182-1, a first determiner 182-2, a second estimator 182-3, and a second determiner 182-4.

The first estimator 182-1 may estimate a first utterance direction according to the detection of the position of the utterer that utters the wake-up word among two or more utterers. The first estimator 182-1 may use a time delay of arrival (TDOA) algorithm which detects directions of sound sources based on a correlation of time differences in the sound sources collected by the plurality of microphones 122 in a time domain to estimate the first utterance direction according to the detection of the position of the utterer uttering the wake-up word. The TDOA algorithm may detect a real angle by comparing a virtual TDOA map between each of the plurality of microphones 122 and the TDOA of a signal received by each of the plurality of microphones 122 in a real environment. However, the TDOA method may solve this problem by detecting the direction by a PDOA method which is performed in a frequency domain because spatial aliasing occurs at a high frequency. Hereinafter, a detailed description of the PDOA algorithm is a well-known technology, and therefore will be omitted.

The first determiner 182-2 is a determiner of the continuous word utterer in the claims described below, and may operate before the second estimator 182-3 estimates the second utterance direction. The first determiner 182-2 may track gazes of each of the two or more utterers from the photographed images of each of the two or more utterers. In the present embodiment, the eye tracking is a technology of tracking a position of gaze by detecting eye movement, and any one of three schemes, a video analysis scheme, a contact lens scheme, and a sensor attachment scheme, may be used according to the type of devices. The video analysis method may detect pupil movement by analyzing the image photographed by the camera 121 in real-time, and compute the gaze direction based on a fixed position reflected by a cornea. This computation method is called pupil center corneal reflection (PCCR). The contact lens scheme uses reflected light of a contact lens with a mirror or a magnetic field of a contact lens with a coil, and has reduced convenience and high accuracy. The sensor attachment scheme uses a magnetic field according to eye movement by attaching sensors (not shown) around eyes, and can detect eye movement even when eyes are closed.

The first determiner 182-2 may perform the lipreading recognition of each of the two or more utterers from the photographed images of each of the two or more utterers. In order to perform the lipreading recognition, the first determiner 182-2 may first detect a face from a photographed image of an utterer using Adapboost (adaptive boosting) algorithm, detect an approximate lip position on the face by a method for detecting a face, and track the lip using feature points of the detected lip, thereby determining whether the uttered speech input through the microphone 122 matches the lip tracking result.

The first determiner 182-2 may determine that an utterer that is uttering as a result of performing the lipreading recognition while staring at the communication robot 100 as a result of tracking gaze is an utterer that utters the continuous word.

The second estimator 182-3 may estimate the second utterance direction according to the detection of the position of the utterer that utters the continuous word among the two or more utterers by analyzing the photographed images of each of the two or more utterers. The second estimator 182-3 may estimate, as the second utterance direction, a difference value between a reference coordinate set in the camera 121 generating the photographed images of the two or more utterers and a position coordinate of the utterer uttering the continuous word included in the photographed image generated by the camera 121.

The second determiner 182-4 is an utterer determiner in the claims to be described later, and may determine, as the first case, the case where the difference between the first utterance direction estimated by the first estimator 182-1 and the second direction estimated by the second estimator 182-3 is within a reference value. Here, the first case may include the case where the wake-up word utterer and the continuous word utterer are the same. In addition, the second determiner 182-4 may determine, as the second case, the case where the difference between the first utterance direction estimated by the first estimator 182-1 and the second direction estimated by the second estimator 182-3 exceeds a preset reference value. Here, the second case may include the case where the wake-up word utterer and the continuous word utterer are different.

The signal processor 183 may determine a voice reception enhancement direction for speech recognition according to the determination by the second determiner 182-4, and perform a process of increasing or decreasing the sensitivity of the uttered speech from the determined voice reception enhancement direction. To this end, the signal processor 183 may use a beamforming method to perform a process of increasing or decreasing the sensitivity of the uttered speech. Here, the beamforming is a method for synthesizing inputs of a plurality of microphones 122 spaced apart from each other to increase sensitivity to sound waves entering at a specific angle and reducing sensitivity to sound waves entering at angles other than a specific angle.

As a result of the determination by the second determiner 182-4, if it is determined that the case where the difference between the first utterance direction and the second utterance direction is within a preset reference value (for example, ±10°) is the first case, the signal processor 183 may determine the voice reception enhancement direction for speech recognition as the first utterance direction and further increase the sensitivity of the speech uttered from the first utterance direction than before. In addition, the signal processor 183 may further reduce the sensitivity of the speech uttered from the second utterance direction than before.

When the signal processor 183 determines, as the second case, the case where the difference between the first utterance direction and the second utterance direction exceeds the preset reference value, the signal processor 183 may determine the voice reception enhancement direction for speech recognition as the second utterance direction, and may further increase the sensitivity of the speech uttered from the second utterance direction than before. In addition, the signal processor 183 may further reduce the sensitivity of the speech uttered from the first utterance direction than before.

In the first case or the second case, the speech recognizer 184 may perform the speech recognition on the continuous word uttered by the utterer. Here, the speech recognizer 184 may activate a speech recognition function when receiving a wake-up word uttered by any one of two or more utterers approaching within a predetermined distance.

In the present embodiment, the speech recognizer 184 may include an auto speech recognizer (ASR) 184-1, a natural language understanding processor 184-2, and a natural language generation processor 184-3, and a text to speech (TTS) unit 184-4.

The auto speech recognizer 184-1 may generate a continuous word text obtained by converting the continuous word included in the uttered speech collected through the microphone 122 into text. In the present embodiment, the auto speech recognizer 184-1 may perform speech to text (STT). The auto speech recognizer 184-1 may convert the continuous word included in the received uttered speech into continuous word text. In the present embodiment, the auto speech recognizer 184-1 may include an utterance recognizer (not shown). The utterance recognizer may include an acoustic model and a language model. For example, the acoustic model may include vocalization-related information, and the language model may include unit phoneme information and information about a combination of the unit phoneme information. The utterance recognizer may convert the continuous word included in the uttered speech into the continuous word text by using vocalization-related information and unit phoneme information. Information about the acoustic model and language model may be stored, for example, an auto speech recognition database (not shown) in the auto speech recognizer 184-1.

The natural language understanding processor 184-2 may analyze an utterance intention of a continuous word included in the uttered speech by performing syntactic analysis or semantic analysis on the continuous word text. Here, the syntactic analysis may divide query text into syntactic units (for example, words, phrases, morphemes and the like) and understand what syntactic elements the divided units have. In addition, the semantic analysis can be performed using semantic matching, rule matching, formula matching, and the like. Accordingly, the natural language understanding processor 184-2 may obtain what intention the continuous word text has, or obtain parameters required to express the intention.

The natural language generation processor 184-3 may generate a response text for the continuous word text using a knowledge base based on the utterance intention analyzed by the natural language understanding processor 184-2.

The text to speech unit 184-4 may generate response uttered speech information as a result of speech conversion for the response text of the natural language utterance form generated by the natural language generation processor 184-3, and output the response uttered speech information through the audio output interface 142.

FIG. 5 is a conceptual diagram of determining the case in which the communication robot according to the embodiment of the present disclosure determines that the wake-up word utterer and the continuous word utterer are the same. In the following description, the description of parts that are the same as those in FIG. 1 to FIG. 4 will be omitted.

FIG. 5 illustrates the example in which the two or more utterers, that is, the utterer1 510 and the utterer2 520 approaching within the predetermined distance from the communication robot 100 are present and the uttered 510 utters the wake-up word and the continuous word, and thus the communication robot 100 determines, as the first case, the case where the wake-up word utterer and the continuous word utterer are the same.

The communication robot 100 may determine the voice reception enhancement direction for speech recognition as the first utterance direction in response to the determination of the first case. In order to smoothly perform the speech recognition processing, the communication robot 100 may perform a process of further increasing the sensitivity of the speech uttered from the utterance direction (first utterance direction) of the utterer1 510 than before and further reducing the sensitivity of the speech uttered from the utterance direction (second utterance direction) of utterer2 520 than before when the utterer2 520 utters.

FIG. 6 is a conceptual diagram of determining a case in which a communication robot according to another embodiment of the present disclosure determines that a wake-up word utterer and a continuous word utterer are different. Hereinbelow, a repetitive description of the common parts previously described with reference to FIG. 1 through FIG. 5 will be omitted.

FIG. 6 illustrates the example in which two or more utterers, that is, an utterer1 610 and an utterer2 620 approaching within a predetermined distance from a communication robot 100 are present, the utterer1 610 utters the wake-up word, and then the utterer2 620 utters the continuous word, and thus the communication robot 100 determines, as a second case, the case where the wake-up word utterer and the continuous word utterer are different.

The communication robot 100 may determine a voice reception enhancement direction for speech recognition as the second utterance direction in response to the determination of the second case. In order to smoothly perform the speech recognition processing, the communication robot 100 may perform a process of further increasing the sensitivity of the speech uttered from the utterance direction (second utterance direction) of the utterer2 620 than before and further reducing the sensitivity of the speech uttered from the utterance direction (first utterance direction) of the utterer1 610 than before.

Figure 7:
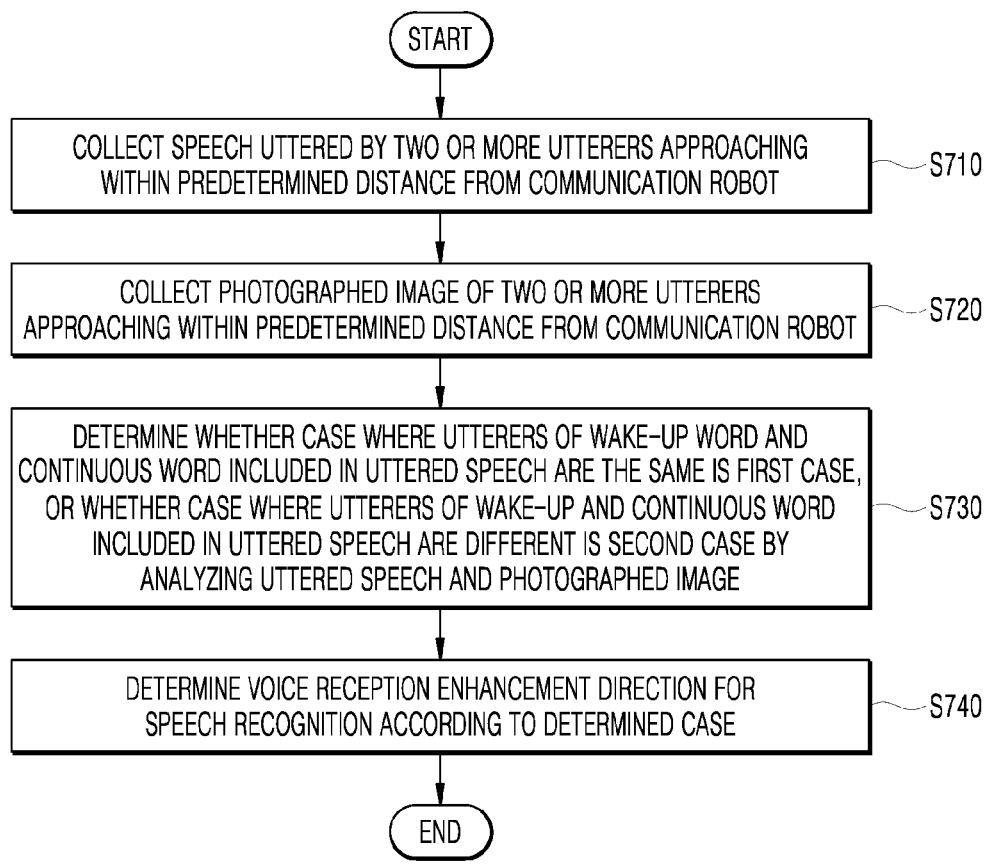
FIG. 7 is a flowchart illustrating a method for driving the communication robot according to an exemplary embodiment of the present disclosure.

FIG. 7 is a flowchart illustrating a method for driving the communication robot 100 according to an embodiment of the present disclosure. In the following description, description of the parts that are the same as those in FIG. 1 to FIG. 6 will be omitted.

Referring to FIG. 7, in step S710, the communication robot 100 collects speech uttered by two or more utterers approaching within a predetermined distance from the communication robot 100. The communication robot 100 may collect speech uttered by two or more utterers input through a microphone.

In step S720, the communication robot 100 collects photographed images of the two or more utterers approaching within the predetermined distance from the communication robot 100. The communication robot 100 may collect photographed images of two or more utterers photographed by a camera.

In step S730, the communication robot 100 determines whether the case where the utterers of the wake-up word and the continuous word included in the uttered speech are the same is a first case, or whether the case where the utterers of the wake-up and the continuous word included in the uttered speech are different is a second case by analyzing the uttered speech and the photographed image.

The communication robot 100 may estimate a first utterance direction according to the detection of the position of the utterer uttering the wake-up word among the two or more utterers, analyze the photographed images of each of the two or more utterers to estimate the second utterance direction according to the detection of the position of the utterer uttering the continuous word among the two or more utterers, determine, as the first case, the case where the difference between the first utterance direction and the second utterance direction is within a reference value, and determine, as the second case, the case where the difference between the first utterance direction and the second utterance direction exceeds the reference value. Here, the communication robot 100 may track gazes of each of the two or more utterers from the photographed images of each of the two or more utterers before estimating the second utterance direction, perform lipreading recognition of each of the two or more utterers from the photographed images of each of the two or more utterers, and determine, as an utterer uttering the continuous word, an utterer that is uttering as a result of performing the lipreading recognition while staring at the communication robot as a result of tracking the gaze.

In step S740, the communication robot 100 determines a voice reception enhancement direction for speech recognition according to the determined case.

When the communication robot 100 determines, as the first case, the case where the difference between the first utterance direction and the second utterance direction is within the preset reference value, the communication robot 100 may determine the voice reception enhancement direction for speech recognition as the first utterance direction, and may further increase the sensitivity of the speech uttered from the first utterance direction than before and further reduce the sensitivity of the speech uttered from the second utterance direction than before. In addition, when the communication robot 100 determines, as the second case, the case where the difference between the first utterance direction and the second utterance direction exceeds the preset reference value, the communication robot 100 may determine the voice reception enhancement direction for speech recognition as the second utterance direction, and may further increase the sensitivity of the speech uttered from the second utterance direction than before and further reduce the sensitivity of the speech uttered from the first utterance direction than before.

In an alternative embodiment, the communication robot 100 may perform the speech recognition for the continuous word uttered by the utterer in the first case or the second case. Here, the communication robot 100 may activate the speech recognition function when receiving the wake-up word uttered by any one of the two or more utterers approaching within the predetermined distance. In the first case or the second case, the communication robot 100 may generate the continuous word text obtained by converting the continuous word uttered by the utterer into text, perform syntactic analysis or semantic analysis on the continuous word text to understand the utterance intention of the continuous word, generate response text using the knowledge base corresponding to the utterance intention, and convert the response text into response uttered speech in a natural language utterance form and output the response uttered speech through the audio output interface.

The embodiments of the present disclosure described above may be implemented through computer programs executable through various components on a computer, and such computer programs may be recorded in computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly conditions otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for operating a communication robot disposed at an any location, the method comprising:
   collecting speech uttered by two or more utterers approaching within a predetermined distance from the communication robot;
   collecting photographed images of the two or more utterers approaching within the predetermined distance from the communication robot;
   determining whether a case where utterers of a wake-up word and a continuous word included in the uttered speech are the same is a first case, or whether a case where the utterers of the wake-up word and the continuous word included in the uttered speech are different is a second case by analyzing the uttered speech and the photographed image; and
   determining a voice reception enhancement direction for speech recognition according to the first case or the second case determined in the determining,
   wherein the determining of whether a case includes:
      estimating a first utterance direction according to a detection of a position of the utterer that utters the wake-up word among the two or more utterers;
      estimating a second utterance direction according to a detection of a position of the utterer that utters the continuous word among the two or more utterers by analyzing the photographed images of each of the two or more utterers;
      determining, as the first case, a case where a difference between the first utterance direction and the second utterance direction is within a reference value; and
      determining, as the second case, a case where a difference between the first utterance direction and the second utterance direction exceeds the reference value.

2. The method of claim 1, wherein the estimating of a first utterance direction includes estimating the first utterance direction according to the detection of the position of the utterer uttering the wake-up word using a time delay of arrival (TDOA) algorithm which detects directions of sound sources based on a correlation of time differences in sound sources collected by a plurality of microphones in a time domain.

3. The method of claim 1, wherein the estimating of a second utterance direction includes estimating, as the second utterance direction, a difference value between a reference coordinate set in a camera generating the photographed images of the two or more utterers and a position coordinate of the utterer uttering the continuous word included in the photographed image generated by the camera.

4. The method of claim 1, further comprising:
tracking gazes of each of the two or more utterers from the photographed images of each of the two or more utterers prior to the estimating of a second utterance direction;
performing lipreading recognition of each of the two or more utterers from the photographed images of each of the two or more utterers; and
determining an utterer that is uttering as a result of performing the lipreading recognition as the utterer uttering the continuous word while staring at the communication robot as a result of tracking the gaze.

5. The method of claim 1, wherein the determining of a voice reception enhancement direction includes further increasing sensitivity of speech uttered from the first utterance direction than before, if it is determined in the determining that the case where the difference between the first utterance direction and the second utterance direction is within the reference value is the first case.

6. The method of claim 1, wherein the determining of a voice reception enhancement direction includes further increasing sensitivity of speech uttered from the second utterance direction than before, if it is determined in the determining that the case where the difference between the first utterance direction and the second utterance direction exceeds the reference value is the second case.

7. The method of claim 1, further comprising:
performing speech recognition on the continuous word after the determining of the voice reception enhancement direction.

8. The method of claim 7, wherein the performing of speech recognition on the continuous word includes activating the speech recognition in response to the reception of the wake-up word uttered by any one of the two or more utterers.

9. The method of claim 8, wherein the performing of the speech recognition on the continuous word includes:
generating continuous word text obtained by converting the continuous word into text;
understanding an utterance intention of the continuous word by performing syntactic analysis and semantic analysis on the continuous word text;
generating response text using a knowledge base corresponding to the utterance intention; and
converting the response text into response uttered speech in a natural language utterance form.

10. A communication robot disposed at an any location, the communication robot comprising:
a first collector configured to collect speech uttered by two or more utterers approaching within a predetermined distance from the communication robot;
a second collector configured to collect photographed images of the two or more utterers approaching within the predetermined distance from the communication robot;
a determiner configured to determine whether a case where utterers of a wake-up word and a continuous word included in the uttered speech are the same is a first case, or whether a case where the utterers of the wake-up word and the continuous word included in the uttered speech are different is a second case by analyzing the uttered speech and the photographed image; and
a signal processor configured to determine a voice reception enhancement direction for speech recognition according to the first case or the second case determined by the determiner,
wherein the determiner includes:
a first estimator configured to estimate a first utterance direction according to a detection of a position of the utterer that utters the wake-up word among the two or more utterers;
a second estimator configured to estimate a second utterance direction according to a detection of a position of the utterer that utters the continuous word among the two or more utterers by analyzing the photographed images of each of the two or more utterers; and
an utterer determiner configured to determine, as the first case, a case where a difference between the first utterance direction and the second utterance direction is within a reference value and determine, as the second case, a case where a difference between the first utterance direction and the second utterance direction exceeds the reference value.

11. The communication robot of claim 10, wherein the first estimator is configured to estimate the first utterance direction according to the detection of the position of the utterer uttering the wake-up word using a time delay of arrival (TDOA) algorithm which detects directions of sound sources based on a correlation of time differences in sound sources collected by a plurality of microphones in a time domain.

12. The communication robot of claim 10, wherein the second estimator is configured to estimate, as the second utterance direction, a difference value between a reference coordinate set in a camera generating the photographed images of the two or more utterers and a position coordinate of the utterer uttering the continuous word included in the photographed image generated by the camera.

13. The communication robot of claim 10, further comprising:
a continuous word utterer determiner configured to track gazes of each of the two or more utterers from the photographed images of each of the two or more utterers prior to the estimating of the second utterance direction, perform lipreading recognition of each of the two or more utterers from the photographed images of each of the two or more utterers, and determine an utterer that is uttering as a result of performing the lipreading recognition as the utterer uttering the continuous word while staring at the communication robot as a result of tracking the gaze.

14. The communication robot of claim 10, wherein the signal processor is configured to further increase sensitivity of speech uttered from the first utterance direction than before, if it is determined by the determiner that the case where the difference between the first utterance direction and the second utterance direction is within the reference value is the first case.

15. The communication robot of claim 10, wherein the signal processor is configured to further increase sensitivity of speech uttered from the second utterance direction than before, if it is determined by the determiner that the case where the difference between the first utterance direction and the second utterance direction exceeds the reference value is the second case.

16. The communication robot of claim 10, further comprising:
a speech recognizer configured to perform speech recognition on the continuous word after the determining of the voice reception enhancement direction.

17. The communication robot of claim 16, wherein the speech recognizer is configured to be activated in response to the reception of the wake-up word uttered by any one of the two or more utterers.

18. The communication robot of claim 17, wherein the speech recognizer is configured to generate continuous word text obtained by converting the continuous word into text, understand an utterance intention of the continuous word by performing syntactic analysis and semantic analysis on the continuous word text, generate response text using a knowledge base corresponding to the utterance intention, and convert the response text into response uttered speech in a natural language utterance form.

\* \* \* \* \*